(12) United States Patent
Cunliffe

(10) Patent No.: US 6,767,514 B2
(45) Date of Patent: Jul. 27, 2004

(54) TEST APPARATUS

(75) Inventor: John Graham Cunliffe, Cheadle Hulme (GB)

(73) Assignee: Baskerville Reactors and Autoclaves Limited, Chorlton (GB)

(*) Notice: Subject to any disclaimer, the term of this patent is extended or adjusted under 35 U.S.C. 154(b) by 669 days.

(21) Appl. No.: 09/797,572

(22) Filed: Mar. 5, 2001

(65) Prior Publication Data

US 2002/0122749 A1 Sep. 5, 2002

(51) Int. Cl.[7] .............................. B01J 19/00; B01L 5/00; B01L 9/00
(52) U.S. Cl. ..................... 422/130; 422/63; 422/103; 422/104; 422/129; 422/131; 422/135
(58) Field of Search .................. 422/63, 65, 69, 422/103–104, 109, 129, 130–131, 135

(56) References Cited

U.S. PATENT DOCUMENTS

| | | | | |
|---|---|---|---|---|
| 3,356,346 A | * | 12/1967 | Landsberger | 366/274 |
| 4,099,923 A | * | 7/1978 | Milberger | 422/80 |
| 4,183,897 A | * | 1/1980 | Lanteri | 422/197 |
| 4,347,216 A | * | 8/1982 | Kawasaki et al. | 422/78 |
| 4,882,127 A | * | 11/1989 | Rosenthal et al. | 422/50 |
| 5,112,574 A | * | 5/1992 | Horton | 422/102 |
| 5,282,543 A | * | 2/1994 | Picozza et al. | 220/255 |
| 5,304,354 A | * | 4/1994 | Finley et al. | 422/196 |
| 5,395,594 A | * | 3/1995 | Nokihara et al. | 422/135 |
| 5,620,659 A | * | 4/1997 | Revesz | 422/90 |
| 5,716,584 A | * | 2/1998 | Baker et al. | 422/131 |
| 5,762,881 A | * | 6/1998 | Harness et al. | 422/132 |
| 5,792,430 A | * | 8/1998 | Hamper | 422/131 |
| 5,866,342 A | * | 2/1999 | Antonenko et al. | 435/7.1 |
| 6,033,912 A | * | 3/2000 | Lautenschlager | 436/55 |
| 6,126,904 A | * | 10/2000 | Zuellig et al. | 422/130 |
| 6,132,686 A | * | 10/2000 | Gallup et al. | 422/130 |
| 6,190,619 B1 | * | 2/2001 | Kilcoin et al. | 422/131 |
| 6,258,323 B1 | * | 7/2001 | Hormann et al. | 422/90 |
| 6,309,608 B1 | * | 10/2001 | Zhou et al. | 422/131 |

FOREIGN PATENT DOCUMENTS

| | | | |
|---|---|---|---|
| DE | 19543401 | * | 5/1997 |
| EP | 916397 | * | 5/1999 |
| GB | 2142826 | | 1/1985 |
| GB | 2355674 | * | 5/2001 |
| WO | 98/20965 | * | 5/1998 |
| WO | 98/57181 | * | 12/1998 |

OTHER PUBLICATIONS

Research Disclosure 1996, 387, 403, (No. 38707).*
Hartfiel, U. LaborPraxis 1991, 23, 56, 58.*
Lucas, M. et al, Chemie Ingenieur Technik 2001, 73, 252–257.*

* cited by examiner

Primary Examiner—Arlen Soderquist
(74) Attorney, Agent, or Firm—Dennison, Schultz, Dougherty & MacDonald

(57) ABSTRACT

An apparatus for carrying out chemical reactions simultaneously on a number of samples under identical pressure conditions comprises a plurality of upwardly open pressure vessels 1 mounted on a lower plate 2 and a plurality of vessel closure means 10 mounted on an upper plate 15 such that the plurality of vessel closure means 10 can be applied to the plurality of pressure vessels 1 simultaneously in order to hermetically seal said vessels 1, each vessel closure means 10 having a passage 19 communicating the interior of an associated pressure vessel 1 with a common manifold 22. A plurality of retaining posts 6 extend upwardly from the lower plate 2 and pass through apertures 27 in the upper plate 15. A locking ring 34 has a plurality of keyhole apertures therein having a wider portion allowing each retaining post 6 to pass through the locking ring 34 when the locking ring 34 is in an unlocked position and a narrower portion that engages a peripheral groove 7 adjacent the upper end of each retaining post 6 when the locking ring 34 is in a locked position.

19 Claims, 4 Drawing Sheets

TEST APPARATUS

Many researchers and chemists require to carry out parallel chemical reactions on a new material or product under identical conditions of temperature and pressure. Frequently such reactions are carried out on small (5 to 50 ml) samples with a variety of gases in a pressurised reaction vessel.

In the past, such work has been carried out in high pressure reaction vessels, containing a single sample, the reaction vessel being sealed prior to being placed in an autoclave. Frequently repeat tests are required on a number of samples under identical conditions of pressure and temperature, leading to problems due to the difficulty in accurately reproducing the same test conditions for each sample.

Accordingly, an object of the invention is to provide an apparatus enabling the carrying out of chemical reactions simultaneously on a number of samples under identical pressure conditions in order. Another object of the present invention is to provide an apparatus permitting the simultaneous secure fitment of closure plugs to a plurality of upwardly open reaction vessels without requiring the use of special tools.

Accordingly, the present invention provides an apparatus for carrying out chemical reactions simultaneously on a number of samples under identical pressure conditions, said apparatus comprising a plurality of upwardly open pressure vessels mounted on a lower plate and a plurality of vessel closure means mounted on an upper plate such that the plurality of vessel closure means can be applied to the plurality of pressure vessels simultaneously in order to hermetically seal said vessels, securing means being provided for securing the plurality of closure means to the plurality of vessels, and wherein each vessel closure means has a passage communicating the interior of an associated pressure vessel with a common manifold.

Preferably said securing means comprises at least one retaining post extending upwardly from said vessel support, said at least one post passing through at least one aperture in said common closure support, locking means being provided for locking said closure support onto said at least one retaining post. Preferably a plurality of retaining posts are provided on said vessel support and said locking means is mounted on said closure support and has a plurality of keyhole apertures therethrough corresponding to said retaining post receiving apertures in said closure support, each retaining post having a shoulder or narrowed neck adjacent the upper end thereof, said locking means being moveable between an unlocked position wherein larger portion of each keyhole slot is aligned with the corresponding aperture in said closure support such that said locating posts can freely pass through said apertures in said closure support and said larger portion of said keyhole slot and a locked position wherein said narrower portion of each keyhole slot engages said shoulder or narrowed neck portion of respective retaining post to lock said closure support onto said retaining posts.

Preferably said plurality of retaining posts are arranged on a circle centred on a central axis of said vessel support and said locking means comprises a locking ring mounted on said closure support for rotation between said locked and unlocked positions.

A safety valve may be provided communicating with said common manifold, said safety valve being movable between an open vent position wherein said manifold, and said plurality of vessels communicating therewith, are vented to the atmosphere and a closed position wherein said manifold and pressure vessels may be pressurised. Preferably said safety valve is associated with said locking ring such that said safety valve can only be moved from its open to its closed position when said locking ring is in its locked position and said locking ring can only be moved from its locked to its unlocked position when said safety valve is in its open position.

Preferably said common manifold communicates with a source of pressurised gas.

Preferably said plurality of pressure vessels are arranged on a circle centred on the central axis of said vessel support, said vessel support comprising a circular plate, said vessel support comprising a substantially circular plate having apertures therein for receiving a lower portion of each pressure vessel, said lower portion having a smaller diameter that the remainder of said vessel, a stepped portion of said vessel abutting the upper surface of said aperture, each vessel being secured into each respective aperture by means of locking means such as a circlip received in an annular slot in said lower portion of each vessel at a position below said vessel support when said vessel is placed therein.

At least one locating post may be provided, extending upwardly from said vessel support, said closure support having at least one aperture therein for receiving said at least one locating post, at least a portion of said at least one retaining post being threaded, at least one correspondingly threaded fastener being associated with said closure support such that said closure support can be guided and drawn down over at least one retaining post by means of said at least one threaded fastener. Preferably two retaining posts are provided at spaced locations on said vessel support.

Preferably each closure means comprises a closure plug adapted to fit into the open end of a respective pressure vessel in order to close said pressure vessel. Preferably an annular groove may be provided around the periphery of said plug to receive an elastomeric sealing 'O' ring. Preferably each closure plug has a gas inlet bore therethrough having a threaded portion allowing a gas line to be secured thereto, said gas line communicating with said common manifold allowing pressurised gas to be supplied to each pressure vessel and said common manifold is connected to a source of high pressure gas, for example a pressurised gas cylinder.

Heating means may be provided for heating each pressure vessel, for example an oil or water bath in which said vessels are immersed or individual heating jackets or band heaters provided around each vessel, or, alternatively, the entire apparatus may be placed on a hot plate.

Where it is required to stir the samples in the vessels, a PTFE coated magnetic follower may be provided in each vessel and the entire apparatus placed on a magnetic stirrer.

According to a further aspect of the invention there is provided an apparatus for carrying out chemical reactions simultaneously on a number of samples under identical pressure conditions, said apparatus comprising a plurality of upwardly open cylindrical pressure vessels mounted on a lower plate, and a plurality of vessel closure plugs mounted on an upper plate, a plurality of retaining posts extending upwardly from said lower plate to pass through a plurality of corresponding retaining post receiving apertures in said upper plate when said plurality of closure plugs are inserted into said plurality of vessels, locking means being mounted on said upper plate, said locking means having a plurality of keyhole apertures therein corresponding to said retaining post receiving apertures in said upper plate each retaining post having a shoulder or narrowed neck adjacent the upper end thereof, said locking means being moveable between an unlocked position, wherein larger portion of each keyhole slot is aligned with the corresponding aperture in said closure support such that said locating posts can freely pass through said apertures in said closure support and said larger portion of said keyhole slot, and a locked position, wherein said narrower portion of each keyhole slot engages said shoulder or narrowed neck portion of respective retaining post to lock said closure support onto said retaining posts.

Preferably said plurality of pressure vessels and said retaining posts are arranged on respective circles centred on a central axis of said lower plate, said locking means comprising a locking ring mounted on said upper plate support for rotation about the central axis of said upper plate between said locked and unlocked positions.

The present invention will be described further, by way of example, with reference to the accompanying drawings, in which.

Figure 1:
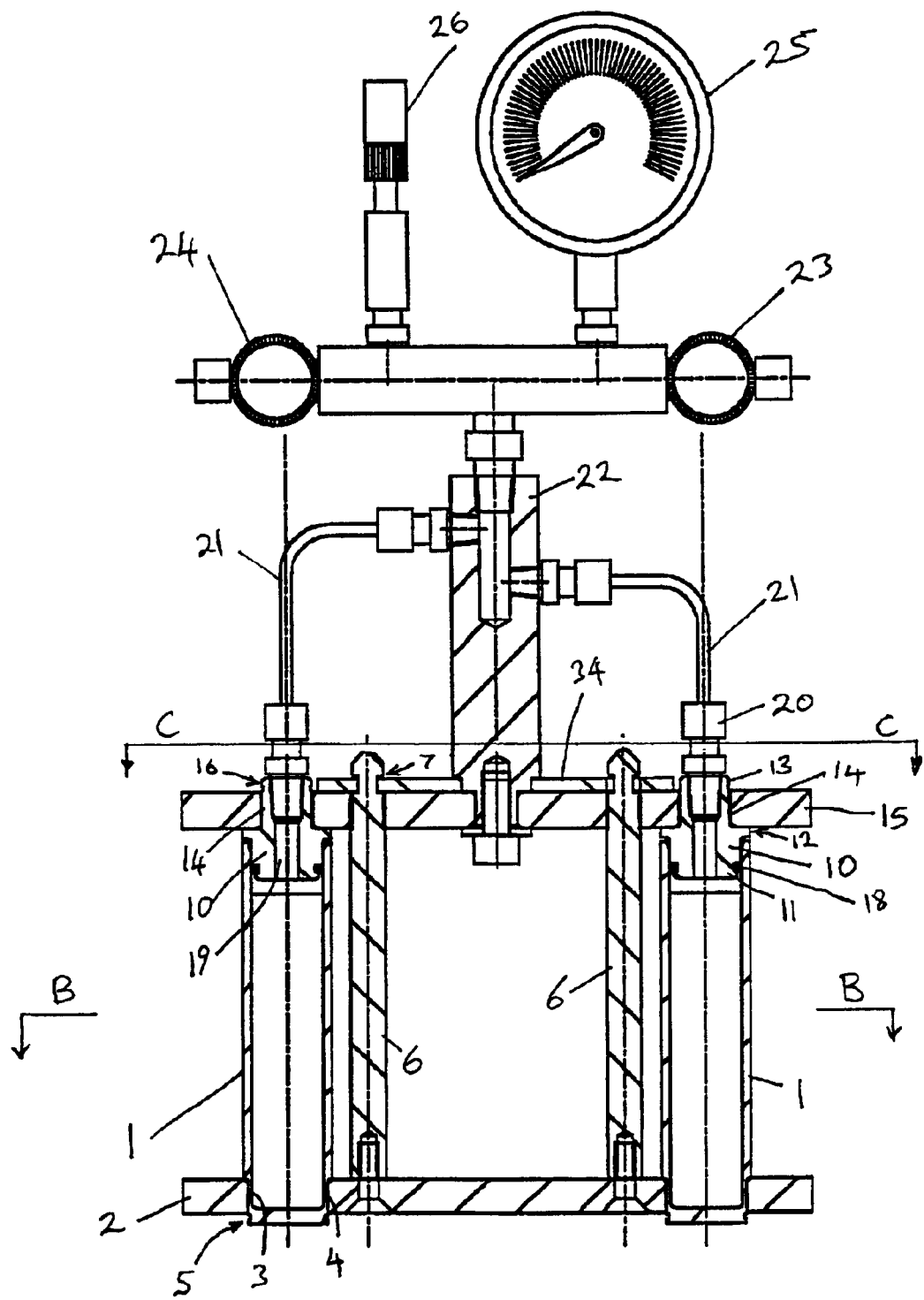
FIG. 1 is a sectional elevation taken on line A—A of a reactor according to the invention.
Figure 2:
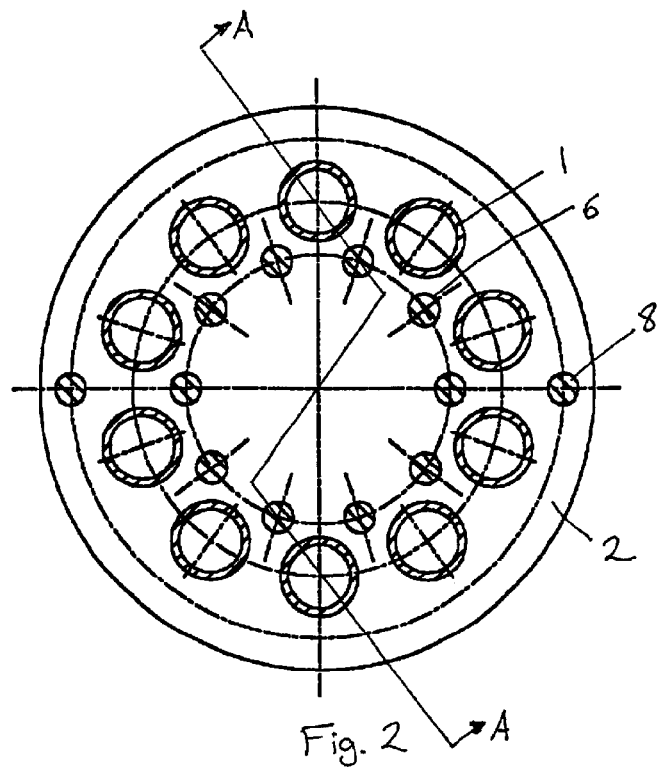
FIG. 2 is a sectional plan view taken on line B—B of the reactor of FIG. 1.
Figure 3:
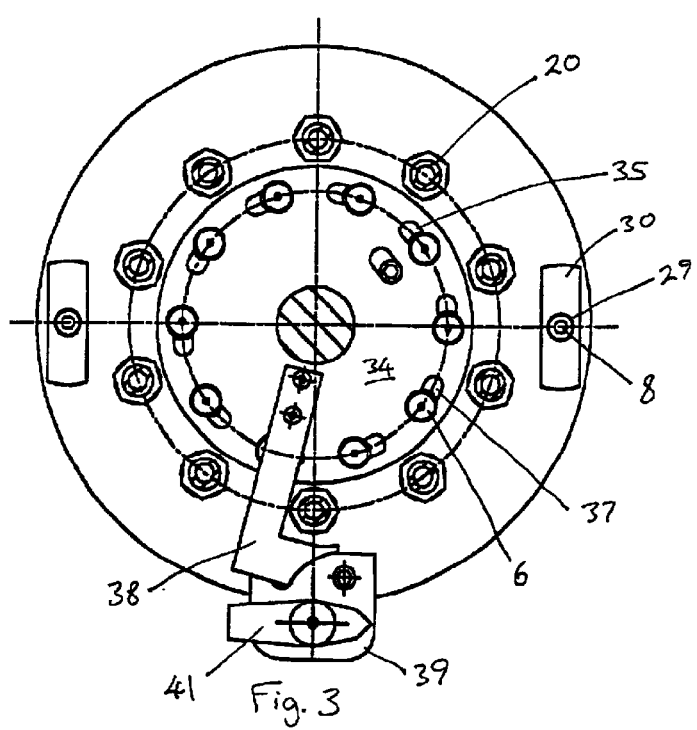
FIG. 3 is a sectional plan view taken on line C—C of the reactor of FIG. 1.
Figure 4:
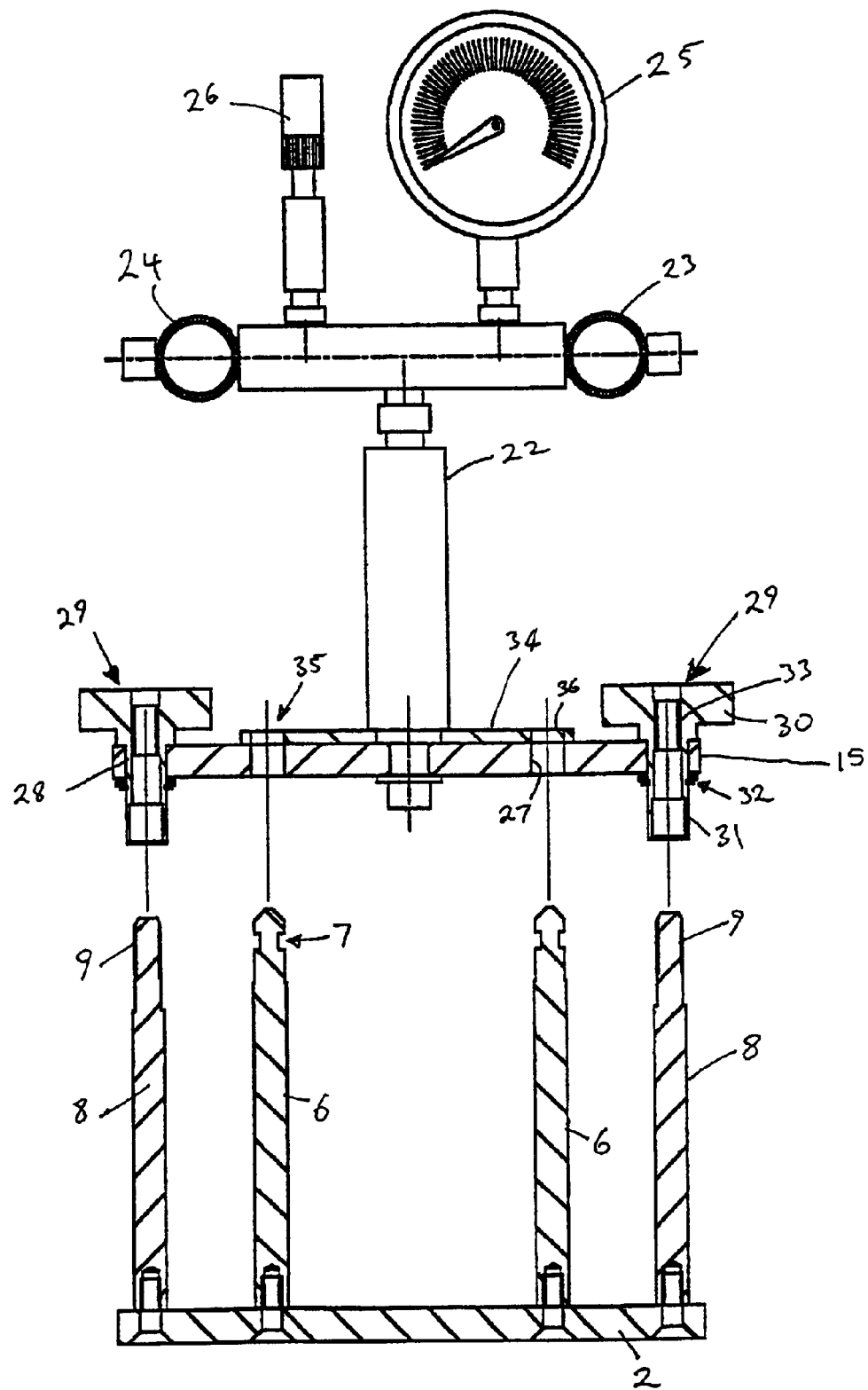
FIG. 4 is a sectional elevation of the reactor of FIG. 1 with the reaction vessels and closure plugs removed for clarity prior to the fitting of the upper plate onto the lower plate.
Figure 5:
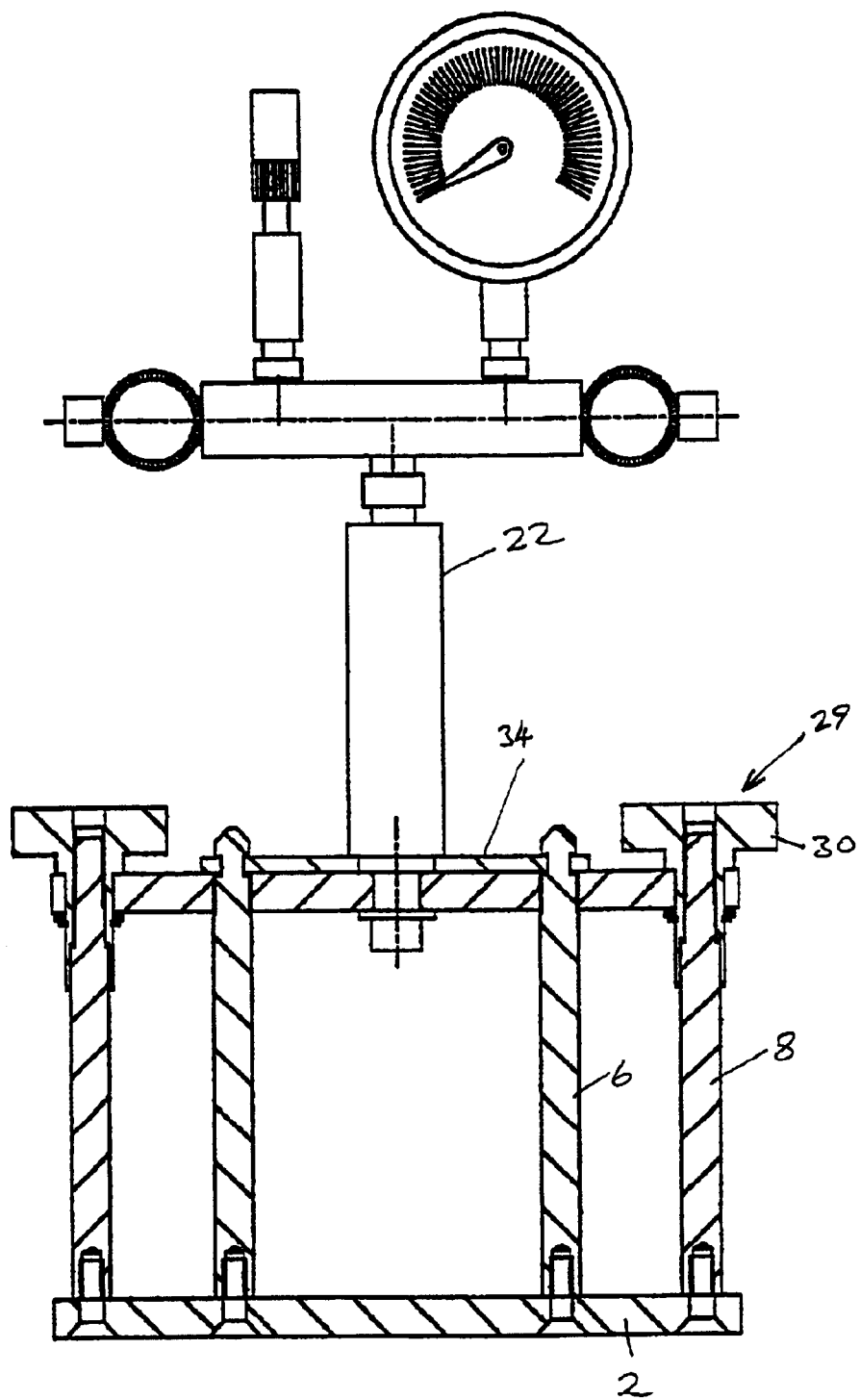
FIG. 5 is a sectional elevation of the reactor of FIG. 4 with the upper plate fitted onto the lower plate.

As shown in FIGS. 1 to 5, the reactor comprises ten separate cylindrical reaction vessels 1 arranged in a circle on a circular lower plate 2. Each vessel 1 has a lower portion 3 having a smaller outer diameter than the remainder of the vessel 1, said lower portion 3 being received in a respective aperture 4 in the lower plate 2. A peripheral groove 5 is provided adjacent the base of each vessel 1 into which groove 5 is fitted a circlip (not shown) to retain each vessel 1 in its respective aperture 4 in the lower plate 2, a shoulder formed at the interface of the lower portion 3 and the remainder of the vessel 1 abutting the upper surface of the lower plate 2. Each vessel has a 20 mm internal diameter and is 95 mm long.

Ten retaining posts 6 extend upwardly from the lower plate 2, arranged on a circle on the lower plate 2. Each retaining post 6 has a peripheral groove 7 adjacent the upper end thereof. A further pair of locating posts 8 extends upwardly from the lower plate 2, mounted on opposite sides of the lower plate 2, the upper ends of the locating posts 8 comprising a threaded portion 9.

A number of closure plugs 10 are provided, one for each reaction vessel 1, each closure plug 10 having a cylindrical lower portion 11 of a diameter to fit into the upper portion of a reaction vessel 1, a lip portion 12 having a diameter larger than the lower portion 11 for abutting the upper surface of a reaction vessel 1 and an upper portion 13 having a diameter less than the lip portion 12. Each closure plug 10 is mounted in an aperture 14 in an upper plate 15, the upper portion 13 of each closure plug 10 being received in a respective aperture 14, said apertures 14 being arranged such that each closure plug 10 is positioned to enter and close a respective reaction vessel 1 when the upper plate 15 is placed over the reaction vessels 1 mounted on the lower plate 2. An annular groove 16 is provided adjacent the top of the upper portion 13 of each closure plug 10 into which is received a circlip (not shown) to retain each closure plug 10 in the upper plate 15. An annular groove 17 is provided in the lower portion 11 of each closure plug 10 in which groove 17 is received an elastomeric 'O' ring 18 in order to provide a gas tight seal between each reaction vessel 1 and its respective closure plug 10.

A central bore 19 is provided in each closure plug 10, said bore 19 being threaded to receive a fitting 20 of a gas line 21. The gas line 21 of each closure plug 10 is connected to a common manifold 22 connected to the upper plate 15. Also connected to the manifold 22 are a gas inlet valve 23, a gas outlet valve 24, a pressure gauge 25 and a pressure relief valve 26. Pressurised gas may be introduced into the reaction vessels 1 by connecting a source of pressurised gas, such as a pressurised gas cylinder, to the inlet valve 23 of the manifold 22.

In order to close the reaction vessels 1, the upper plate 15 has a plurality of apertures 27,28 therein for receiving the upper ends of the retaining posts 6 and the locating posts 8 of the lower plate 2 such that the upper plate 15 can be lowered over the retaining and locating posts 6,8 and the closure plugs 10 can be inserted into the reaction vessels 1. Two wing nuts like fastening devices 29 are rotatably mounted in apertures 28 in the upper plate 15, positioned to receive the upper ends of the locating posts 8 of the lower plate 2. Each fastening device 29 comprises a upper portion having outwardly extending wing portions 30 forming a handle, permitting the fastening device 29 to be turned by hand, and a central tubular portion 31, extending downwardly through the upper plate 15 to a position below the upper plate 15 such that the locating posts 8 can be received in the lower ends of the tubular portion 31 of the fastening devices 29 before the retaining posts 6 and the closure plugs 10 respectively engage the corresponding apertures 27 and vessels 1. A peripheral groove 32 is provided in the outer surface of the tubular portion 31 of each fastening device 29 at a position below the lower surface of the upper plate, a circlip being inserted in the respective peripheral groove 32 in order to retain each fastening device 29 in its respective aperture 28 in the upper plate 15. A portion 33 of the tubular portion 31 of each fastening device 29 is threaded to receive the correspondingly threaded portion 9 of one of the locating posts 8.

A locking mechanism is provided on the upper plate 15 for retaining the retaining posts 6 in their respective apertures 27 in the upper plate 15 to secure the closure plugs 10 in the reaction vessels 1. The locking mechanism comprises a locking ring 34 mounted on the upper surface of the upper plate 15 for rotation about the central axis of the upper plate 15, said locking ring 34 extending over the apertures 27 in the upper plate 15 for receiving the retaining posts 6 of the lower plate 2. A plurality of keyhole shaped apertures 35 are provided in the locking ring 34 positioned to be capable of being aligned with the apertures 27 in the upper plate 15 for receiving the retaining posts 6, each of said keyhole shaped apertures 35 having a first portion 36 having a width or diameter equal to or greater than a respective retaining post aperture 27 in the upper plate 15, and a second narrower portion 37 extending therefrom having a width less than the diameter of the retaining post aperture 27, said second narrower portion 37 having a width corresponding to the diameter of the peripheral groove 7 adjacent the top of each retaining post 6. The locking ring 34 is mounted on the upper surface of the upper plate 15 such that it is rotatable between an unlocked position wherein the first portion 36 of each aperture 35 is aligned with a respective locating post aperture 27 in the upper plate 15 and a locked position wherein the second portion 37 of each aperture 35 is aligned with a respective locating post aperture 27 in the upper plate. An operating arm 38 is provided mounted radially on the locking ring 34 to allow the locking ring 34 to be moved between its locked and unlocked positions.

A safety valve 39 is provided on the upper surface of the upper plate 15, said safety valve 39 cooperating with the locking mechanism to prevent the locking ring 34 from being moved to the unlocked position while the reaction vessels 1 are pressurised. The safety valve 39 is connected to the manifold 22 via a gas line 40 and vents the manifold 22, and hence the reaction vessels 1, to the atmosphere when the safety valve 39 is in its open position. An operating handle 41 is provided on the safety valve 39 for moving the valve between its open and closed positions. The operating handle 41 of the safety valve 29 and the operating arm 38 of the locking ring 34 interface in such a way that:

a) With the safety valve 39 in the open or vent position the locking ring 34 can be moved from its locked to its unlocked position and vice versa;

b) With the safety valve 39 in its closed position the locking ring 34 cannot be moved from its locked position to its unlocked position without first opening the safety valve 39 (the operating handle of the safety valve abuts the operating arm of the locking ring);

c) With the locking ring 34 in the locked position the safety valve 39 cannot be moved from its open to its closed position.

In use, individual samples may be placed in each reaction vessel 1 mounted on the lower plate 2. The reaction vessels 1 may then be simultaneously closed by lowering the upper plate 15 onto the locating and retaining posts 6,8 such that firstly the locating posts 8 are received in the tubular portion 31 of each fastening device 29 on the upper plate 15 and subsequently the retaining posts 6 pass through the respective apertures 27 therefore in the upper plate 5, with the locking ring 34 in the unlocked position and the safety valve 39 open. The wing nut like fastening devices 29 of the upper plate 15 may then be screwed onto the threaded portions 9 of the two locating posts 8 in order to urge the closure plugs 10 into the respective reaction vessels 1. Once the closure plugs 10 are fully inserted into the reaction vessels 1 the locking ring 34 is moved to the locked position, by means of the operating arm 38, whereby the second portion 37 of each aperture 35 in the locking ring 34 engages the peripheral groove 7 of each respective retaining post 6 to secure the upper and lower plates 15,1 to each other and thus secure the closure plugs 10 in the reaction vessels 1. Finally the fastening devices 29 of the upper plate 15 may be unscrewed slightly to transfer any load exerted on the closure plugs 10 when the vessels 1 are pressurised to the retaining posts 6.

Once the locking ring 34 has been moved to its locked position the safety valve 39 can be closed and the gas inlet valve 23 opened to allow pressurised gas to enter each of the reaction vessels 1.

Where heating of the samples in each vessel is required the vessels 1 may be immersed in a water or oil bath, or alternatively individual heating jackets or band heaters may be wrapped around each vessel 1. The use of separate band heaters provides the option of heating the vessels 1 to different temperatures should such be required.

The entire apparatus may be made from a substantially non-reactive alloy, for example 316 stainless steel. However, in order to avoid any risk of reaction of the sample with the stainless steel vessel 1 a glass liner may be provided for each vessel 1 or alternatively a PTFE coated liner may be used. It is also envisaged that each vessel 1 and closure plug 10 may be coated with PTFE on its inner surfaces.

Where it is required to stir the sample in each vessel 1 a magnetic follower, which may be coated in PTFE, may be inserted in each vessel 1 and the entire apparatus may be placed on a conventional magnetic stirrer. The diameter of the upper and lower plates 15,1 in the preferred embodiment, typically 140 mm, is specifically chosen for this purpose. Where heating of the vessels 1 is also required the apparatus may equally be placed on a hotplate/stirrer.

In order to monitor the temperature in each vessel 1, temperature probes may be inserted into each vessel 1.

Where it is required to remove a sample from a vessel 1 without disassembling the apparatus, or where a fluid is required to be added to a vessel during a reaction, a further fluid inlet/outlet port may be provided in one or more of the gas line 21 adjacent each pressure vessel 1, for example in the form of a T piece connected to one or more of the gas lines, or a separate inlet/outlet port may be provided in the closure plug 10 thereof allowing fluid to be added and/or removed from said vessel 1.

Whilst in the above preferred embodiment the reaction vessels and the retaining posts are arranged on respective circles centred on the central axis of a circular lower plate and the locking mechanism comprises a locking ring rotatably mounted on a circular upper plate, it is envisaged that the upper and lower plates may be square, rectangular or any other shape and the reaction vessels may be arranged in a rectangular or square pattern or be packed together in any other pattern. In such a case the locking mechanism may comprise a locking plate having a plurality of keyhole apertures therein corresponding to retaining post receiving apertures in the upper plate each retaining post having a shoulder or narrowed neck adjacent the upper end thereof, the locking plate being mounted on the upper plate such that it can be linearly moved between an unlocked position, wherein larger portion of each keyhole slot is aligned with the corresponding aperture in said closure support such that said locating posts can freely pass through said apertures in said closure support and said larger portion of said keyhole slot, and a locked position, wherein said narrower portion of each keyhole slot engages said shoulder or narrowed neck portion of respective retaining post to lock said closure support onto said retaining posts. Such an arrangement may permit more vessels to be arranged in a given space than that which can be achieved using the circular arrangement shown in the drawings.

What is claimed is:

1. An apparatus for carrying out chemical reactions simultaneously on a number of samples under identical pressure conditions, said apparatus comprising a plurality of upwardly open pressure vessels carried by a vessel support and a plurality of vessel closure means mounted on a common closure support such that said plurality of vessel closure means can be applied to said plurality of pressure vessels simultaneously in order to hermetically seal said vessels, securing means being provided for securing said plurality of closure means to said plurality of vessels, and wherein each vessel closure means has a passage communicating the interior of an associated pressure vessel with a common manifold.

2. An apparatus as claimed in claim 1, wherein said securing means comprises at least one retaining post extending upwardly from said vessel support, said at least one post passing through at least one aperture in said common closure support, locking means being provided for locking said closure support onto said at least one retaining post.

3. An apparatus as claimed in claim 2, wherein a plurality of retaining posts are provided on said vessel support and said locking means is mounted on said closure support and has a plurality of keyhole apertures therethrough corresponding to said retaining post receiving apertures in said closure support, each retaining post having a shoulder or narrowed neck adjacent the upper end thereof, said locking means being moveable between an unlocked position wherein larger portion of each keyhole slot is aligned with the corresponding aperture in said closure support such that said locating posts can freely pass through said apertures in said closure support and said larger portion of said keyhole slot and a locked position wherein said narrower portion of each keyhole slot engages said shoulder or narrowed neck portion of respective retaining post to lock said closure support onto said retaining posts.

4. An apparatus as claimed in claim 3, wherein said plurality of retaining posts are arranged on a circle centred on a central axis of said vessel support and said locking means comprises a locking ring mounted on said closure support for rotation between said locked and unlocked positions.

5. An apparatus as claimed in claim 4, wherein a safety valve is provided communicating with said common manifold, said safety valve being movable between an open vent position wherein said manifold, and said plurality of vessels communicating therewith, are vented to the atmosphere and a closed position wherein said manifold and pressure vessels may be pressurised.

6. An apparatus as claimed in claim 5, wherein said safety valve is associated with said locking ring such that said safety valve can only be moved from its open to its closed position when said locking ring is in its locked position and said locking ring can only be moved from its locked to its unlocked position when said safety valve is in its open position.

7. An apparatus as claimed in claim 3, wherein said locking means comprises a locking plate mounted on said closure support for linear movement between its locked and unlocked positions.

8. An apparatus as claimed in claim 1, wherein said common manifold communicates with a source of pressurised gas.

9. An apparatus as claimed in claim 1, wherein said plurality of pressure vessels are arranged on a circle centred on the central axis of said vessel support, said vessel support comprising a circular plate, said vessel support comprising a substantially circular plate having apertures therein for receiving a lower portion of each pressure vessel, said lower portion having a smaller diameter that the remainder of said vessel, a stepped portion of said vessel abutting the upper surface of said aperture, each vessel being secured into each respective aperture by means of locking means such as a circlip received in an annular slot in said lower portion of each vessel at a position below said vessel support when said vessel is placed therein.

10. An apparatus as claimed in claim 1, wherein at least one locating post is provided, extending upwardly from said vessel support, said closure support having at least one aperture therein for receiving said at least one locating post, at least a portion of said at least one retaining post being threaded, at least one correspondingly threaded fastener being associated with said closure support such that said closure support can be guided and drawn down over at least one retaining post by means of said at least one threaded fastener.

11. An apparatus as claimed in claim 10, wherein two retaining posts are provided at spaced locations on said vessel support.

12. An apparatus as claimed in claim 1, wherein each closure means comprises a closure plug adapted to fit into the open end of a respective pressure vessel in order to close said pressure vessel.

13. An apparatus as claimed in claim 12 wherein an annular groove may be provided around the periphery of said plug to receive an elastomeric sealing 'O' ring.

14. An apparatus as claimed in claim 13, wherein each closure plug has a gas inlet bore therethrough having a threaded portion allowing a gas line to be secured thereto, said gas line communicating with said common manifold allowing pressurised gas to be supplied to each pressure vessel and said common manifold is connected to a source of high pressure gas, for example a pressurised gas cylinder.

15. An apparatus as claimed in claim 1, wherein heating means are provided for heating each pressure vessel, said heating means comprising an oil or water bath in which said vessels are immersed or individual heating jackets or band heaters provided around each vessel, or a hot plate upon which the entire apparatus is placed.

16. An apparatus as claimed in claim 1, wherein, in order to stir a sample in each said vessel a PTFE coated magnetic follower is provided in each vessel and the entire apparatus is placed on a magnetic stirrer.

17. An apparatus as claimed in claim 1, wherein a glass liner is provided in each vessel.

18. An apparatus for carrying out chemical reactions simultaneously on a number of samples under identical pressure conditions, said apparatus comprising a plurality of upwardly open cylindrical pressure vessels mounted on a lower plate, and a plurality of vessel closure plugs mounted on an upper plate, a plurality of retaining posts extending upwardly from said lower plate to pass through a plurality of corresponding retaining post receiving apertures in said upper plate when said plurality of closure plugs are inserted into said plurality of vessels, locking means being mounted on said upper plate, said locking means having a plurality of keyhole apertures therein corresponding to said retaining post receiving apertures in said upper plate each retaining post having a shoulder or narrowed neck adjacent the upper end thereof, said locking means being moveable between an unlocked position, wherein larger portion of each keyhole slot is aligned with the corresponding aperture in said closure support such that said locating posts can freely pass through said apertures in said closure support and said larger portion of said keyhole slot, and a locked position, wherein said narrower portion of each keyhole slot engages said shoulder or narrowed neck portion of respective retaining post to lock said closure support onto said retaining posts.

19. An apparatus as claimed in claim 18, wherein said plurality of pressure vessels and said retaining posts are arranged on respective circles centred on a central axis of said lower plate, said locking means comprising a locking ring mounted on said upper plate support for rotation about the central axis of said upper plate between said locked and unlocked positions.

* * * * *